United States Patent [19]

Ihde, Jr.

[11] 4,123,383

[45] Oct. 31, 1978

[54] SILICA BASED DEFOAMER COMPOSITIONS HAVING IMPROVED STABILITY

[75] Inventor: Frederick J. Ihde, Jr., Mountain Lakes, N.J.

[73] Assignee: Diamond Shamrock Corporation, Cleveland, Ohio

[21] Appl. No.: 834,163

[22] Filed: Sep. 19, 1977

[51] Int. Cl.² ............................................. B01D 19/04
[52] U.S. Cl. .................................... 252/321; 252/358
[58] Field of Search ................................ 252/321, 358

[56] References Cited

U.S. PATENT DOCUMENTS

| | | | |
|---|---|---|---|
| 2,843,551 | 7/1958 | Leonard et al. | 252/321 |
| 3,909,445 | 9/1975 | Ernst | 252/321 |
| 4,021,365 | 5/1977 | Sinka et al. | 252/321 |
| 4,024,072 | 5/1977 | Shane et al. | 252/321 X |

*Primary Examiner*—Leland A. Sebastian
*Assistant Examiner*—E. Suzanne Parr
*Attorney, Agent, or Firm*—Neal T. Levin; Leslie G. Nunn, Jr.

[57] ABSTRACT

Shelf life of silica based defoamer composition is improved by adding oil soluble resins and optionally aliphatic fatty acids to retard separation and to inhibit settling. The composition is useful in preventing foaming or in defoaming aqueous systems such as water based protective coatings, adhesives, black liquors and monomer stripping.

30 Claims, No Drawings

SILICA BASED DEFOAMER COMPOSITIONS HAVING IMPROVED STABILITY

BACKGROUND OF THE INVENTION

1. Field of the Invention

This invention relates to silica based defoamer compositions having improved storage stability and their use in aqueous systems.

2. Description of the Prior Art

Silica based defoamers are well known as defoamers for aqueous systems. One of the problems of silica based defoamers, however, is the tendency of silica particles to settle out of the carrier liquid (usually a hydrocarbon or natural oil) in which they are suspended. Extremely fine particle silica can be used to provide stability, but fine particle silica is in limited supply and more expensive than other grades.

The following patents show the defoaming properties of various components in defoamer compositions but none teaches addition of hydrocarbon resins or fatty acids to improve shelf life of silica based defoamer compositions.

U.S. Pat. No. 3,076,768 (Boylan) describes silica base defoamers containing hydrophobic silica, hydrocarbon oil and a spreading agent.

U.S. Pat. No. 3,207,698 (Liebling and Canaris) describes silica base defoamers containing hydrophobic silica of a particular nature and hydrocarbon oil.

U.S. Pat. No. 3,697,440 (Lichtman and Woodward) describes defoamer compositions containing an oil insoluble polymer, a second oil insoluble or soluble polymer, a hydrocarbon oil and an amide.

U.S. Pat. No. 4,021,365 (Sinka and Lichtman) describes use of quick-chilled amides in silica based defoamer compositions to inhibit settling of silica particles.

SUMMARY OF THE INVENTION

Defoamer compositions containing hydrophobic silica particles, liquid carriers, monoethers of polyoxyalkylene glycols, diesters of polyalkylene glycols, trialkyl phosphate esters and finely divided emulsifiable polyolefin waxes are improved by adding an effective amount of oil soluble resin and optionally an aliphatic acid having from 8 to 22 carbon atoms sufficient to stabilize the compositions by keeping silica particles in suspension for extended periods of time during storage. Defoamer compositions containing from about 2.0 to about 20.0% by weight of hydrophobic silica are stabilized by adding from about 3.0 to about 25.0% of oil soluble resin and optionally from about 0 to about 15% of an aliphatic acid. Foam controlling amounts of these defoamer compositions are added to aqueous systems containing foam producing solids to control or prevent foaming.

DESCRIPTION OF THE PREFERRED EMBODIMENTS

Useful defoamer compositions may contain the ranges of Indicated % and Preferred % of the ingredients shown below:

| | Indicated % | Preferred % |
|---|---|---|
| hydrophobic silica particles | 2.0 – 20.0 | 2.5 – 4.0 |
| monoethers of polyoxyalkylene glycols | 5.0 – 40.0 | 10.0 – 20.0 |
| diesters of polyoxyalkylene glycols | 2.0 – 25.0 | 5.0 – 10.0 |
| trialkyl phosphate esters | 2.0 – 10.0 | 2.5 – 5.0 |
| finely divided emulsifiable polyolefin waxes | 0.5 – 5.0 | 1.0 – 2.0 |
| oil soluble resins | 3.0 – 25.0 | 5.0 – 10.0 |
| aliphatic acids | 0.0 – 15.0 | 5.0 – 10.0 |
| liquid carriers present in an amount which is the difference between the sum of % of above ingredients and 100% | balance 100% | balance 100% |

Hydrophobic silica useful in this invention may be prepared using well known silicas such as (1) silica aerogel, a colloidal silica prepared by displacing the water from a silica hydrogel by a low-boiling, water-miscible, organic liquid, heating in an autoclave above the critical temperature of the liquid and then venting the autoclave; (2) so-called fume silica, a colloidal silica obtained by burning silicon tetrachloride and collecting the resulting silica smoke; (3) precipitated silica prepared by destabilization of water-soluble silica under conditions that do not permit formation of a gel structure, but rather cause the flocculation of silica particles into coherent aggregates such as by the addition of sodium ions to a sodium silicate solution; as well as aluminum silicate, copper silicate, magnesium silicate and zinc silicate. Almost any grade and particle size of silica may be used but finer particles are preferred.

An example of a precipitated silica which may be used in the preparation of hydrophobic silica is QUSO® G30 (Philadelphia Quartz Company, Valley Forge, Pa. 19482). This micro-fine precipitated silica is produced by depolymerization of high purity sand to obtain a soluble silicate which is chemically treated to repolymerize and to precipitate extremely fine particulate amorphous silica. Hydrophilic QUSO G30 silica has a pH of 8.5; a surface area of 300 square meters per gram; and a bulk density of 10 pounds per cubic foot. This silica has a very high external surface area. The silica particles form loose clusters or agglomerates which may be subdivided with moderate energy.

There are four distinct layers in each silica particle. The core is a random, three-dimensional polymer of $SiO_2$ units, completely covered with silanol (SiOH) groups. A layer of hydrogen bonded water is attached to the silanol groups and the outer coating is a layer of free or physically adsorbed water.

Any suitable method for treating the normally hydrophilic silica to render it hydrophobic may be used. One very satisfactory method involves spraying silica particles with silicone oil and then heating at elevated temperature, i.e., from about 250° C. to about 350° C., for about one-half to about 2 hours. The amount of silicone oil sprayed on the particles may vary from about 5% to about 100% by weight based on the weight of the silica. However, amounts from about 7% to about 25% by weight are usually satisfactory and are preferred.

The silicone oil may be a polysiloxane oil such as an alkyl, aryl, alicyclic or aralkyl siloxane or polysiloxane having a viscosity of from about 10 to about 3000 centistokes at 25° C. Preferred silicone oils include alkyl polysiloxanes having viscosities of from about 40 to about 100 centistokes at 25° C. These alkyl polysiloxanes include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane and didodecyl polysiloxane.

Finely divided silica may also be rendered hydrophobic by treatment with vapors of an organosilicon halide or mixture of organosilicon halides. Examples of suitable organosilicon halides are given in U.S. Pat. Nos. 2,306,222 and 2,412,470 and include alkyl (methyl), aryl (phenyl), alkaryl (tolyl) and aralkyl (phenyl methyl) silicon halides. Treatment may be carried out by agitating finely divided material in a closed container in the presence of vapors of the treating material, e.g., dimethyl dichlorosilane. Amount of treating material and the length of treatment will depend upon the surface area of the inorganic material and the nature of the organosilicon halide employed. Use from about 5% to about 15% by weight of treating agent based on the weight of silica and a treatment time from about one-half hour to about 2 hours are satisfactory.

Another method of rendering the silica hydrophobic is to disperse silica in silicone oil, i.e., in a concentration from about 2–10% and heat the resulting dispersion to about 250°–300° C. for about an hour. The hydrophobic silica may then be extracted by centrifuging the mixture after dilution with hexane or similar solvent and then drying the resulting solid.

Hydrophobic silica used in this invention should have an average particle size less than about 10 microns and preferably less than about 5 microns with the most preferred silica having an average particle size from about 0.02 micron to about 1 micron. When measuring the particle size in terms of Oil Absorption Value, 125 (grams of oil absorbed per 100 grams of silica) is the minimum useful value and a value of 170 or higher is preferred.

The carrier liquid may be any substance which is inert towards the other ingredients, immiscible with water, liquid at room temperature and atmospheric pressure, has a viscosity of from about 30 to about 400 SUS (Saybolt Universal Seconds at 38° C.) and is a solvent for the oil soluble resin. Although any substance meeting the above criteria may be used, preferred carrier liquids are natural oils, mineral oils and hydrocarbons.

Examples of preferred carrier liquids include, but are not limited too: mustard seed oil, caster oil, rice bran oil, soya oil, corn oil, mineral seal oil, Stoddard Solvent, petroleum naphtha, paraffinic mineral oil, naphthenic mineral oil, toluene, xylene, benzene, hexane, heptane, octane, dodecane, kerosene and the like. When desired, mixtures of two or more carrier liquids may be used. An especially preferred carrier liquid is paraffinic mineral oil.

Monoethers of polyoxyalkylene glycols include water-insoluble polyoxyalkylene glycol fluids and lubricants such as the Ambiflo ® L series and UCON ® LB series used in metal to metal lubrication. In the UCON ® LB series, the number following the polymer designation LB is the viscosity of the ether in SUS (Saybolt Universal Seconds at 100° F.). For example, the SUS viscosity of UCON LB1715 is 1715 and the SUS viscosity of UCON LB385, a monobutyl ether of polyoxypropylene glycol, is 385. The SUS viscosities at 100° F. of various ethers of this series vary from about 65 to about 1800. Monohydroxy polyoxypropylene monoethers may be prepared by condensing from 1 to 100 moles of propylene oxide with one mole of a monohydric alcohol having from about 1 to about 6 carbon atoms. They are soluble in organic solvents such as alcohols, ketones, toluene and gasoline but are insoluble in water at low as well as high temperatures. They can be used in aqueous systems over very wide temperature ranges.

Diesters of polyoxyalkylene glycols are obtained by reacting diethylene glycol, dipropylene glycol, polyoxyethylene glycols, polyoxypropylene glycols and their mixtures with aliphatic monocarboxylic acids having carbon chain lengths of from about 8 to about 22 carbon atoms. These acids may be straight chain or branched chain aliphatic acids and may be saturated, unsaturated or hydroxylated. Useful acids include caprylic acid, ethylhexoic acid, lauric acid, myristic acid, behenic acid, palmitic acid, stearic acid, arachidic acid, tallow fatty acids, oleic acid, linoleic acid, erucic acid, coconut oil fatty acids, tall oil acids and the like as well as mixtures of these acids. These fatty acids are well known articles of commerce and are available in the form of mixtures such as commercial stearic acid and lauric acid. Commercial fatty acids often contain unsaturated acids of varying carbon chain lengths. Molecular weights of the polyoxyalkylene glycols used in the preparation of these diesters may be as high as 2000. Various diesters as well as the fatty acids and glycols used in their preparation are described in U.S. Pat. No. 2,868,734 — DeCastro et al, issued Jan. 13, 1959 whose teachings on diesters are incorporated by reference herein.

Trialkyl phosphate esters include tributoxyethyl phosphate, triallyl phosphate, tributyl phosphate, trichloroethyl phosphate, tricresyl phosphate, tri-2-ethyl phosphate, triethyl phosphate, trimethyl phosphate, triphenyl phosphate, tris-2-chloroethyl phosphate, cresyl diphenyl phosphate, methyl diphenyl phosphate, tri-dimethyl-phenyl phosphate, alkyl aryl phosphate.

Finely divided emulsifiable polyethylenes include oxidized homopolymers such as A-C Polyethylene ® 629, 629A, 655, 680, 690 and 392 (Allied Chemical, Morristown, N.J. 07960). Polyethylene 629 is a wax-like polymer melting in the range of 213°–221° F. and having a penetration number (100g., 5 sec., 77° F.) of 3–6 and an acid number of 14–17. There are many patents describing the oxidation of polyethylene. For example, U.S. Pat. No. 3,160,621 — Hagemeyer, Jr., et al, issued Dec. 8, 1964 describes preparation of emulsifiable polyethylene by thermally degrading polyethylene to a molecular weight of from 1000 to 6000 and then oxidizing at a temperature of from 100° C. to 250° C. Autoxidation may be initiated by organic peroxides such as tertiary butyl peroxide, tertiary butyl hydroperoxide, benzoyl peroxide or cumene hydroperoxide. If desired, an alkali hydroxide or carbonate may be added to stabilize color and hardness. The teachings of this patent relating to emulsifiable polyethylene are incorporated herein by reference. Additional details on oxidation of polyethylene may be found on pages 449–453 of Volume 6 of the Encyclopedia of Polymer Science and Technology (Interscience Publishers, Inc., N.Y., N.Y. 1967). Further, other polyolefin waxes may be used.

Oil soluble resins used in this invention are also known as "hydrocarbon resins" in the industry. This group includes polymeric substances, often of ill-defined composition, principally, in the following classes: copolymers from variable, incompletely characterized mixtures of unsaturated hydrocarbons derived from coal known as coumarone-indene resins or from petroleum known as petroleum resin; polymers derived from one or more terpenes known as terpene resins; and condensation products of aromatic hydrocarbons with formaldehyde known as hydrocarbon-formaldehyde resins. The term "hydrocarbon resins" excludes, therefore, other hydrocarbon polymers such as polyethylene, polystyrene or polybutadiene. See page 557 of Volume 7 of the Encyclopedia of Polymer Science and Technology (Interscience Publishers, Inc., N.Y., N.Y. 1967).

Coumarone-indene resins are readily fusible, low-molecular-weight polymers produced by catalytic and thermal polymerization of mixtures containing coumarone (benzofuran) and indene and are principally polyindenes. They were one of the first synthetic resins produced in the United States and have been manufactured for about fifty years. Initially, they were produced as by-products in refining coal-tar solvents, but did not have very good color and were not high-melting. Improved methods of polymerization have been developed and closer cut fractions used to produce resins having better color, better odor and higher melting points.

The name "coumarone-indene" is not particularly suitable for these resins because the amount of coumarone present is small, often less than 10% of the resin components. Styrene and its homologs also are important as sources of resins in the coal-tar fractions. Some petroleum resin producers use the term polyvindene type to describe resins with a very low or unknown indene content; however, these resins do have an appreciable aromatic content.

Coumarone-indene resins are available in a variety of softening points from those of soft balsams melting below room temperature to those of hard brittle resins melting above 150° C. Color varies from pale yellow through amber to vary dark. Softer resins melting below 100° C. are usually supplied in 55-gal lightweight steel drums. The harder varieties, which may also be obtained in drums, are broken up into lumps before use. However, the hard resins are often flaked and supplied in paper bags for convenience in handling. These resins may also be contained in the form of solutions of 60-70% solids in hydrocarbon solvents.

Manufacture of coumarone-indene resins involves purification and blending of raw materials (feed stocks), polymerization, recovery of solvent and finally packaging of the finished resin. Since the resin raw materials are by-products from the manufacture of coke, their composition may vary with the coking cycle. Crudes from various coke producers show some variation and may be blended to average out variations or fractionated to obtain better feed stock.

Catalysts used in commercial resin production include sulfuric acid, sulfuric acid-ether blends, boron trifluoride and its complexes, and aluminum chloride. With light oil the decreasing order of efficiency of the catalyst is reported to be hydrofluoric acid, aluminum chloride, sulfuric acid, ferric chloride, clays, tin tetrachloride, solid phosphoric acid and zinc chloride.

Gaseous boron trifluoride has been used as has its complexes with phenol and with acetic acid; the latter have been reported to give resins of better color.

In polymerization, resin formers are always diluted to 50% and often to 30% because concentration above 50% form very viscous resin solutions. Typical diluents include aromatic hydrocarbons such as xylene or hi-flash naphtha. Because of the large evolution of heat, reaction control is much easier in more dilute solutions.

Although batch manufacture of these resins is traditional, resins can be made by continuous processes. Boron trifluoride or its etherate may be used as catalysts in continuous processes. Even though polymerization is rapid, holding times of 15 to 30 minutes have been suggested in continuous processes to ensure complete polymerization. Commercially acceptable resins may be made by continuous processes.

While coumarone-indene resins are often finished in batch stills, continuous finishing may be employed. In continuous finishing, the resin solution is heated to a high temperature, flashed under vacuum and steam is often injected to complete removal of heavy oils. Since the heating period is greatly reduced in continuous operations, better-colored resins are obtained.

Coumarone-indene resins are finished to specified softening points; most resins are finished in the 100°-120° C. range. Three degrees of tolerance are often allowed in resin specifications. Color is the other property specified for resin control. Color property is largely controlled by the feeds employed and finishing conditions. Extensive heating at high temperatures degrades color quality of resins.

Most of the commercial resin grades are produced by boron trifluoride ethyl etherate and sulfuric acid catalysts in continuous or batch systems.

Physical properties of commercial coumarone-indene resins vary widely, depending upon origin and manner of production. Color ranges vary from very pale amber to dark brown and softening points from 5° C. (low-viscosity liquids) to as high as 215° C. (hard, brittle solids).

Even though the softening point and color of commercial resins are always specified and other properties are often determined, two are the sole specifications for many resins. Solution viscosities and melt viscosities are used in control testing to monitor the behavior of a resin. Melt viscosity is useful in establishing conditions for molten handling. Additional details on coumarone-indene resins are given on pages 272-292 of Volume 4 of the Encyclopedia of Polymer Science and Technology (Interscience Publishers, Inc., N.Y., N.Y. 1966).

Petroleum resins are synthetic polymeric products characterized by unsaturation and derived from variable mixtures of unsaturated monomers obtained as volatile by-products in the cracking of natural gas, gas oil or petroleum naphthas. These unsaturated monomers include mono- and diolefins, cyclic olefins and diolefins and vinyl derivatives of aromatic hydrocarbons.

Since these unsaturated monomers form gums during storage, they are unsuitable for use in gasoline. The first petroleum-derived hydrocarbon polymers resulted from an effort to "clean" a petroleum fraction for use in gasoline by polymerization of unsaturated monomers followed by distillation of unreacted saturated hydrocarbons. The resultant polymers or "still bottoms" were dark liquids having unpleasant odors. Since these initial experiments, many petroleum streams have been selectively polymerized so that today a variety of inexpensive petroleum resins, both liquid and solid, and exhibiting a wide range of properties, are available. When compared with polyethylene, polypropylene, polybutadiene and polystyrene, petroleum resins are lower in molecular weight and darker in color; they range from brittle solids to viscous liquids.

Raw materials used in the manufacture of petroleum hydrocarbon resins include by-products from vapor-phase steam or thermal cracking of hydrocarbons to produce ethylene, propylene, butadiene and/or isoprene. The hydrocarbons cracked to produce these olefins and diolefins range from ethane through paraffin wax.

There are three steps in the manufacture of petroleum resins:

1. Fractional separation of types of polymerizable monomers. For example, a cyclic olefin fraction may be selected for the production of a particular type of hydrocarbon resin.

2. Reblending of selected polymerizable fractions. This procedure permits production of the particular type of polymer desired. For example, methylcyclopentadiene monomer is blended with a $C_5$ olefin-diolefin stream to obtain gelfree petroleum resins.

3. Polymerization. Polymerization conditions must be controlled to produce resins having the required softening point or molecular-weight range. For example, low-temperature polymerization results in higher-molecular-weight polymers. In petroleum hydrocarbon resin manufacture, either the catalyst is added to the feed or the feed is added to the catalyst. Addition rates are controlled to maintain reaction temperatures within rather narrow limits. After reaction is complete, catalyst is neutralized and removed by either water wash or filtration. Ammonia, caustic alkali or alkaline earth hydroxides may be used to destroy and neutralize the metallic halide catalyst. Nonreactive fraction of the feed or solvents added to control viscosity during polymerization is then removed by distillation.

Petroleum hydrocarbon resins have common properties such as water resistance, wide compatibility with other resins, solubility in low-cost solvents, chemical neutrality, good electrical properties and non-saponifiability. Commercial petroleum resins are commonly characterized by their color, softening point, iodine number, specific gravity, solution viscosity and aniline point. Additional information on petroleum resins may be found on pages 853–859 of Volume 9 of the Encyclopedia of Polymer Science and Technology (Interscience Publishers, Inc., N.Y., N.Y. 1968).

Terpene resins are polymers of naturally occurring unsaturated hydrocarbon monomers known as terpenes. Terpenes are constituents of many essential oils and are isoprene oligomers having the general formula $(C_5H_8)_n$. The simplest terpenes are the monoterpenes, which are dimers of isoprene, having the empirical formula $C_{10}H_{16}$. Terpene resins are prepared by the catalytic polymerization of terpene monomers.

Terpene monomers occur in many plants. Coniferous plants are the main source of commercial terpenes. Pine trees are particularly rich in terpenes. Terpenes are obtained from pine trees and pine wood as mixtures of terpenes, known in the industry as turpentines. Gum turpentine is commercially obtained from the fractional distillation of the tappings of living pine trees; wood turpentine is steam distilled from stumps of pine trees; sulfate turpentine is a by-product by the sulfate pulp process (paper manufacture). Composition of turpentines varies significantly depending on the geographic location and the species of pine trees from which they are obtained.

Terpene resins are very tacky thermoplastic polymers ranging in consistency from viscous liquids to very hard brittle materials. Some of the polyterpenes are almost water white in color. Polyterpenes are highly stable to heat and ultraviolet radiation.

Terpene resins are prepared by the polymerization of terpenic monomers. Polymerization can be initiated by high-energy radiation, Ziegler-type catalysts, free-radical catalysts, and cationic catalysts, such as Friedel-Crafts catalysts. Friedel-Crafts catalysts are the most commonly used in commercial production. Commercial production of terpene resins by the catalytic polymerization of terpene monomers is carried out in suitable aliphatic or aromatic solvents.

Terpene resins are thermoplastic hydrocarbon polymers exhibiting a high degree of tackiness. There are significant differences in physical properties of terpene resins. Physical properties depend primarily on the terpene monomer and the conditions under which the polymer is prepared. Basically, terpene resins are low-molecular-weight polymers and like other amorphous hydrocarbon resins, they are mixtures of polymers of various molecular-weight fractions and chain lengths. Additional information on terpene resins may be found on pages 575–594 of Volume 13 of the Encyclopedia of Polymer Science and Technology (Interscience Publishers, Inc., N.Y., N.Y. 1970).

Hydrocarbon-formaldehyde resins are prepared by condensing aromatic hydrocarbons with formaldehyde. Preparation of these resinous products from the acid-catalyzed condensation of aromatic hydrocarbons with formaldehyde was first described by Baeyer in 1872–1873. Since that time, numerous patents and scientific publications relating to the preparation and application of these resins have appeared. However, only in the past decade have xylene-formaldehyde and related hydrocarbon-formaldehyde resins gained widespread industrial interest. Resurgence of interest in these products coincides with the development by the petroleum industry of improved catalytic reforming processes for upgrading low-cost paraffinic and naphthenic hydrocarbons to benzene, toluene, o-xylene, m-xylene, p-xylene, ethylbenzene, mesitylene, pseudocumene, durene and related pure aromatic materials.

Xylene-formaldehyde resins generally possess molecular weights of 200 to 1000 and vary in consistency from mobile liquids to viscous semisolids. Color varies from pale yellow to dark amber, depending upon processing conditions and catalysts. Additional information on hydrocarbon-formaldehyde resins may be found on pages 539–555 of Volume 7 of the Encyclopedia of Polymer Science and Technology (Interscience Publishers, Inc., N.Y., N.Y. 1967).

Oil soluble resins useful in this invention include Cumar ® R-16 and P-25, Nevex ® 100, Neville LX-1065 and Nevillac ® 10 (products of Neville Chemical Co., Pittsburgh, Pa. 15225) and Polyvel ® GP65, G100, M130 and M100 (products of Velsicol Chemical Corp., Chicago, Ill. 60611).

Cumar R-16 is a thermoplastic hydrocarbon resin. This coumarone-indene resin is an amber brittle solid melting at 94°–107° C.

Cumar P-25 is a thermoplastic resin. This coumarone-indene resin is a dark brown tacky viscous liquid melting at 20°–30° C.

Nevex 100 is a thermoplastic resin. This aromatic hydrocarbon resin is in the form of an amber brittle solid or yellow flakes melting at 95°–105° C.

Neville LX-1065 is a thermoplastic resin. It is a petroleum based, alkylated aromatic hydrocarbon resin in the form of an amber brittle solid melting at 100°–107° C.

Nevillac 10 is a thermoplastic resin in the form of a dark brown viscous liquid. It is a modified coumarone-indene resin melting at 5°–10° C.

Polyvel GP65 is a petroleum thermoplastic hydrocarbon amorphous polymer. It is a semi-solid, amber amorphous plasticizer having a Saybolt Furol viscosity (210° F.) of 40–60 sec and an aniline point of 65°–79° C.

Polyvel G100 is a resin derived from a mixture of cyclic/vinyl aromatic hydrocarbon monomers. This petroleum derived hydrocarbon resin is in the form of a light yellow brittle solid or amber flakes having an iodine number of 120. The resin has a melting point of 100°–105° C., molten viscosity (350° F.) of 1,100 cps and an acid number of 0–2.

Polyvel M130 is a petroleum hydrocarbon resin. This unsaturated hydrocarbon resin is a dark amber brittle solid melting at 120°–144° C.

Polyvel M100 is a thermoplastic curing to thermosetting petroleum hydrocarbon resin high in conjugated and nonconjugated diene content having a molecular weight of 1200. It is an amber brittle solid melting at 93°–105° C., having an iodine number of 200 and a molten viscosity (300° F.) of 1,500 cps.

Aliphatic acids useful in this invention include saturated and unsaturated fatty acids containing from about 12 to about 22 carbon atoms. Specific fatty acids such as oleic acid, linoleic, stearic and lauric acid as well as mixtures of fatty acids such as tall oil acids, coconut acids and tallow acids may be used. A useful tall oil fatty acid is Acintol® FA-1 produced by Arizona Chemical Co.

The carrier liquid may be any material which is inert towards the other ingredients, immiscible with water, liquid at room temperature and atmospheric pressure and which has a viscosity of from about 30 to about 400 SUS (Saybolt Universal Seconds at 38° C.). Although any material meeting the above criteria may be used, the preferred carrier liquids are natural oils, mineral oils and hydrocarbons.

Preferred carrier liquids include, but are not limited to: mustard seed oil, castor oil, rice bran oil, soya oil, corn oil, mineral seal oil, Stoddard Solvent, petroleum naphtha, paraffinic mineral oil, naphthenic mineral oil, toluene, xylene, benzene, hexane, heptane, octane, dodecane, kerosene and the like. If desired, mixtures of carrier liquids can be used. Paraffinic mineral oil is a preferred carrier liquid.

The defoamer composition may be prepared by the following procedure:

Part A is prepared by dispersing the desired quantities of emulsifiable polyolefin wax and oil soluble resin in a liquid carrier such as mineral oil to obtain a homogenous mixture.

Part B is prepared by mixing the desired quantities of hydrophobic silica suspended in a liquid carrier such as mineral oil, monoether of polyoxyalkylene glycol, diester of polyoxyalkylene glycol, trialkyl phosphate ester and optionally aliphatic acid.

The defoamer composition may be prepared by slowly adding Part A to agitated Part B, then mixing the mixture until uniform and finishing by homogenizing. Or, all ingredients may be mixed together, heated to required temperature, cooled to 30° C. and homogenized. Any solid ingredients other than silica must be heated high enough to dissolve in the liquid. The composition may be prepared at temperatures ranging from about 20° C. to about 150° C.

The following describes applications where the defoamer composition is used and its evaluation in these applications.

Only a small amount of defoamer composition is required to control foam in an aqueous system. The defoamer composition is useful in preventing and/or suppressing foam in aqueous systems such as latex paints and other water based protective coatings. It may be added at any point during manufacture of a water based protective coating in proportions of from about 1 to about 15 lb per 100 gal of formulated product with the preferred quantities being about 4 to about 8 lb per 100 gal. The following procedure may be used to determine the effectiveness of the defoamer composition in preventing foam in water based protective coatings.

The weight of a gallon of latex paint, which does not contain defoamer, is determined. An 8 oz paint can is then half-filled with a sample of the paint and the desired amount of defoamer composition added to the paint in the can. The defoamer is mixed into the latex paint and the paint shaken for 5–10 minutes on a mechanical paint shaker (Red Devil Mixer). The best defoamer yields the highest weight/gallon latex paint after the shaker test. If desired, relative stability of the defoamer in paint can be determined by heating paint samples containing the defoamer to 49° C., holding them at 49° C. for 14 days and then retesting their foam control by the above procedure.

The defoamer is also useful in reduction of existing foam (knockdown) and prevention of foam formation (holddown) in black liquor during the pulping process in papermaking. When used in papermaking, from about 0.003 to about 0.5 parts by weight of defoamer composition per 100 parts by weight of dry pulp is added to the pulp.

The following test method and apparatus may be used to determine effectiveness of the defoamer composition in knocking down and holding down foam in black liquor. The apparatus and method may also be used to evaluate the defoamer composition in any liquid which forms foam during agitation and/or heating.

The primary container for the liquid being tested is a 1000 cc tall form beaker. A curved glass outlet fused onto the base of the beaker is connected with a rubber hose to a centrifugal pump which continuously circulates test liquid from the beaker through the pump and back into the beaker. Test liquid is pumped at such a rate that test liquid in the beaker is agitated by the reentering test liquid to the extent that foam forms. The test liquid is pumped at a rate of about 2 gal/min. Test liquid enters the beaker at a point about 6 cm above the liquid surface and strikes the liquid surface in the beaker at an angle of 90°.

When the test liquid is black liquor, the test is begun by charging 500 cc of freshly obtained concentrated black liquor heated to about 75° C. into the beaker. The black liquor, when quiescent, fills the beaker to a level of about 8.3 cm above the bottom which is marked and labeled the 0 line. In the holddown test, 0.1 cc of defoamer composition is added to the black liquor in the beaker. The pump and stop watch are then started simultaneously and height of the foam above the 0 line is measured at 15 second intervals for the first minute, then at 30 second intervals thereafter and recorded. In the knockdown test, the black liquor is agitated and heated to about 75° C. prior to the addition of defoamer composition. After foam is built up to 8 cm, 0.1 cc of the defoamer composition being tested is added to the black liquor; the height of foam is then measured and data recorded. As pointed out above, this apparatus and method may be used to test other liquids which tend to foam during agitation or heating.

The defoamer composition may also be used in the manufacture of animal glue or other water-base adhesives. Here, it is added to adhesives to prevent entrained air bubbles from reducing the surface contact area and thus the strength of the adhesive bond. The defoamer composition may be added to the adhesive formulation during blending of ingredients in proportions of from 0.05 to 0.5 (preferably 0.1 to 0.3) parts by weight per 100 parts by weight of adhesive solids. The following procedure can be used to evaluate the defoamer composition in an adhesive. All parts in this procedure are by weight unless otherwise indicated.

Forty parts of animal glue are mixed with 60 parts of water at a temperature of 60°-71° C. This mixture is agitated at moderate speed and 3 or 4 drops of phenol are added. The temperature and agitation of the mixture are maintained constant, while 35 parts of corn syrup are blended into 65 parts of the mixture. After these components are thoroughly mixed, the mixer is set at "high speed" and 0.5 parts by weight of the defoamer composition being tested is added. High speed mixing is continued for 5 min at 65.6° C., then discontinued and the mixture allowed to cool undisturbed. After cooling to room temperature, surface of the gelled glue is examined for bubbles and other surface irregularities.

For a fuller understanding of the nature of this invention, reference may be made to the following examples which are given merely to illustrate the invention and are not to be construed in a limiting sense. All weights, proportions and percentages are on a weight basis unless otherwise indicated. Likewise, all temperatures are ° C. unless otherwise indicated.

EXAMPLE I

This example describes the preparation of a defoamer composition which does not contain an oil soluble resin and is outside the scope of this invention. The defoamer composition was prepared by the following procedure using the quantities of ingredients shown in the column entitled Example I in Table I.

Part A was prepared by dispersing 2.0 g emulsifiable polyethylene wax (A-C Polyethylene 629, Allied Chemical, Morristown, N. J. 07960) in 40.3 g of 105 SUS (Saybolt Universal Seconds) paraffinic naphthenic mineral oil (Sunthrene 410, Sun Oil Company, Philadelphia, Pa. 19103) to obtain a homogenous mixture at 105°-110° C.

Part B was prepared by mixing at 25° to 30° C., 25.2 g of hydrophobic silica suspended in 100-115 SUS paraffinic mineral oil, 20.0 g of butyl monoether of polyoxypropylene glycol (UCON LB-1715), 10.0 g of dioleate of polyoxyethylene glycol having a molecular weight of 600, 2.5 g of tributoxyethyl phosphate. The hydrophobic silica suspension was prepared by spraying 1.63 g of dimethyl polysiloxane having a viscosity of 50 centistokes on to 9.3 g of agitated powdered precipitated silica (QUSO G-30, Philadelphia Quartz Co., Philadelphia, Pa. 19103) and then roasting the sprayed silica for 5 hours at 405°-410° F. while water vapor was vented off. The roasted silica was then slowly added to 91.32 g of paraffin mineral oil heated to 200° F., mixed until uniform and then homogenized in a laboratory homogenizer (Manton-Gaulin) at 3000 psi. Temperature was then adjusted to 80°-90° C. and 0.05 g of dimethyl polysiloxane was added to obtain a dispersion of 7% by weight of hydrophobic silica in 1.68% by weight of dimethyl polysiloxane and 91.32% by weight paraffin mineral oil.

The defoamer composition was then prepared by slowly adding Part A at 105° C. to agitated Part B at 30° C. and mixing the composition while cooling to 30° C. After cooling, the composition was finished by homogenizing in a laboratory homogenizer. The finished defoamer composition was a cloudy amber liquid which had a Brookfield viscosity of 430 cps and separated into two layers: 80% top layer and 20% bottom layer after standing one day. The ingredients used in the preparation of the composition of Example I are given in Table I and its physical properties in Table II.

EXAMPLES II–XII

These examples describe preparation and evaluation of defoamer compositions which are within the scope of this invention, i.e., they employ oil soluble resins and optionally aliphatic acids. Each defoamer composition was prepared using the quantities of ingredients shown for the particular example in Table I. The procedure of Example I was followed with the exception that the quantities of oil soluble resin shown in each example in Table I was added to Part A which was then mixed and dispersed with Part B optionally containing aliphatic acid to obtain a homogenous defoamer composition.

Brookfield viscosity of the finished defoamer composition was measured and recorded in Table II. Each composition was then allowed to stand for the number of days shown in Table II to determine its shelf life. Shelf life is reported in Table II as % *Separation upper layer* and % *Separation lower layer* for the number of days shown in the table. Addition of oil soluble resin and the optional addition of aliphatic acid to defoamer compositions resulted in improved shelf life.

Table I

| Example | \multicolumn{12}{c}{Defoamer Compositions} |
|---|---|---|---|---|---|---|---|---|---|---|---|---|
|  | I | II | III | IV | V | VI | VII | VIII | IX | X | XI | XII |
| hydrophobic silica particles (a) | 25.2 | 25.2 | 25.2 | 25.2 | 25.2 | 25.2 | 25.2 | 25.2 | 25.2 | 25.2 | 25.2 | 25.2 |
| monoethers of polyoxyalkylene glycols | 20.0 | 20.0 | 20.0 | 20.0 | 20.0 | 20.0 | 20.0 | 20.0 | 20.0 | 20.0 | 25.2 | 15.0 |
| diesters of polyoxyalkylene glycols | 10.0 | 10.0 | 10.0 | 10.0 | 10.0 | 10.0 | 10.0 | 10.0 | 10.0 | 10.0 | 10.0 | 10.0 |
| trialkyl phosphate esters | 2.5 | 2.5 | 2.5 | 2.5 | 2.5 | 2.5 | 2.5 | 2.5 | 2.5 | 2.5 | 5.0 | 4.0 |
| finely divided emulsifiable polyolefin waxes | 2.0 | 2.0 | 2.0 | 2.0 | 2.0 | 2.0 | 2.0 | 2.0 | 2.0 | 2.0 | 1.0 | 1.0 |
| liquid carriers | 40.3 | 32.8 | 32.8 | 32.8 | 32.8 | 32.8 | 32.8 | 32.8 | 32.8 | 32.8 | 19.0 | 35.6 |
| oil soluble resins |  |  |  |  |  |  |  |  |  |  |  |  |
| Cumar R-16 |  | 7.5 |  |  |  |  |  |  |  |  |  |  |
| Cumar P-25 |  |  | 7.5 |  |  |  |  |  |  |  |  |  |
| Nevex 100 |  |  |  | 7.5 |  |  |  |  |  |  |  |  |
| Neville LX1065 |  |  |  |  | 7.5 |  |  |  |  |  |  |  |
| Nevillac 10 |  |  |  |  |  | 7.5 |  |  |  |  |  |  |
| Polyvel GP65 |  |  |  |  |  |  | 7.5 |  |  |  |  |  |

Table I-continued

| Example | Defoamer Compositions | | | | | | | | | | | |
|---|---|---|---|---|---|---|---|---|---|---|---|---|
| | I | II | III | IV | V | VI | VII | VIII | IX | X | XI | XII |
| Polyvel G100 | | | | | | | | | 7.5 | | 5.0 | 4.0 |
| Polyvel M130 | | | | | | | | | | 7.5 | | |
| Polyvel M100 | | | | | | | | | | | 7.5 | |
| aliphatic acids | | | | | | | | | | | | |
| Acintol FA-1 | | | | | | | | | | | 9.6 | 5.2 |

(a) contains 7% hydrophobic silica particles in 1.68% dimethyl polysiloxane and 91.32% paraffin oil Table II

| Example | Physical Properties of Defoamer Compositions | | | | | | | | | | | |
|---|---|---|---|---|---|---|---|---|---|---|---|---|
| | I | II | III | IX | V | VI | VII | VIII | IX | X | XI | XII |
| Brookfield viscosity cps (a) | 430 | 562 | 382 | 575 | 430 | 730 | 412 | 538 | 915 | 655 | 620 | 350 |
| % Separation upper layer | 80 | None | 1 | None | None | 75 | 65 | 94 | None | 70 | 1 | None |
| % Separation lower layer | 20 | None | 99 | None | None | 25 | 35 | 6 | None | 30 | 99 | None |
| Separation after days | 1 | 38 | 59 | 50 | 50 | 50 | 19 | 85 | 30 | 5 | 65 | 12 |

(a) Brookfield Viscometer Model LVF Spindle 2 at 12 RPM

EXAMPLE XIII

This example shows evaluation of defoamer compositions of Examples I–XII as paint defoamers using the following Shaker Tests.

A holddown foam test was conducted by adding the defoamer composition to be tested to a water based paint containing no defoamer and shaking on a Red Devil Mixer for the indicated number of minutes. The shaken sample was then weighted and the weight used to calculate density of the paint (lb/gal) and the volume % of entrapped air. These results were then compared with those for unshaken paint without defoamer shown as 0 lb Control (No Shake) and for shaken paint without defoamer shown as 0 lb Control (Shake) in the table below.

Shaker Test I was made using concentrations of 0 and 8 Defoamer Composition from Example XI per 100 gal of Acrylic Latex Semi-Gloss 203-T326 (United Paint and Chemical Corp., Southfield, Mich.) and shaking the samples on a Red Devil Mixer for 5 min to obtain the results shown below:

| Defoamer Concentration | lb/gal after shaking | lb weight loss | % entrained air |
|---|---|---|---|
| 0 lb Control (No Shake) | 11.21 | — | — |
| 8 lb Example XI | 11.12 | 0.09 | 0.80 |
| 0 lb Control (Shake) | 10.88 | 0.33 | 2.94 |

These results show that use of 8 lb of the defoamer composition of Example XI results in a substantial reduction in air entrainment.

Shaker Test II was made using concentrations of 0 and 6 lb Defoamer Composition from the Examples shown in the first column below per 100 gal of Vinyl-/Acrylic Interior Coating 392-10762-113 (E.I. duPont de Nemours & Co., Inc., Wilmington, Delaware 19898) and shaking the samples on Red Devil Mixer for 5 min to obtain the following results:

| Defoamer Concentration | lb/gal after shaking | lb weight loss | % entrained air |
|---|---|---|---|
| 0 lb Control (No Shake) | 10.91 | — | — |
| 6 lb Example VII | 10.89 | 0.02 | 0.18 |
| 6 lb Example VIII | 10.87 | 0.04 | 0.36 |
| 6 lb Example IX | 10.89 | 0.02 | 0.18 |
| 6 lb Example X | 10.93 | 0.00 | 0.00 |
| 0 lb Control (Shake) | 9.52 | 1.39 | 12.74 |

These results show that use of 6 lb of the defoamer compositions of Examples VII, VIII, IX and X result in substantial reductions in air entrainment.

Shaker Test III was made using concentrations of 0 and 4 lb Defoamer Composition from the Examples shown in the first column below per 100 gal of Semi-Gloss 5L-4225 Paint (Southland Paint Co., Raritan, N.J. 08869) and shaking the samples on a Red Devil Mixer for 5 min to obtain the following results:

| Defoamer Concentration | lb/gal after shaking | lb weight loss | % entrained air |
|---|---|---|---|
| 0 lb Control (No Shake) | 10.53 | — | — |
| 4 lb Example II | 10.13 | 0.40 | 3.80 |
| 4 lb Example III | 10.13 | 0.40 | 3.80 |
| 4 lb Example IV | 10.16 | 0.37 | 3.51 |
| 4 lb Example V | 10.11 | 0.42 | 3.99 |
| 4 lb Example VI | 10.14 | 0.39 | 3.70 |
| 0 lb Control (Shake) | 9.61 | 0.92 | 8.73 |

These results show that use of 4 lb of the defoamer compositions of Examples II, III, IV, V and VI result in substantial reductions in air entrainment.

While the invention has been described with reference to certain specific embodiments thereof, it is understood that it is not to be so limited since alterations and changes may be made therein which are within the full and intended scope of the appended claims.

What is claimed is:

1. In an aqueous system defoamer composition containing from about 2 to about 20% by weight of hydrophobic silica suspended in a liquid carrier, the improvement consisting essentially of addition of an effective amount of oil soluble resin and optionally an aliphatic acid having from about 8 to about 22 carbon atoms sufficient to stabilize and inhibit settling of the silica suspended in the liquid carrier.

2. The defoamer composition of claim 1 wherein there is present from about 3 to about 25% by weight of oil soluble resin and optionally from about 0 to about 15% by weight of an aliphatic acid.

3. The defoamer composition of claim 2 wherein there is present from about 5 to about 40% of monoether of polyoxyalkylene glycol, from about 2 to about 25% by weight of diester polyoxyalkylene glycol, from about 2 to about 10% by weight of trialkyl phosphate ester, from about 0.5 to about 5% by weight of finely divided emulsifiable polyolefin wax and balance liquid carrier.

4. The composition of claim 1 wherein the oil soluble resin is selected from the group consisting of coumarone-indene resin, petroleum hydrocarbon resin, terpene resin and hydrocarbon-formaldehyde resin.

5. The composition of claim 1 wherein the oil soluble resin is a coumarone-indene resin.

6. The composition of claim 1 wherein the oil soluble resin is a petroleum hydrocarbon resin.

7. The composition of claim 1 wherein the oil soluble resin is a terpene resin.

8. The composition of claim 1 wherein the oil soluble resin is a hydrocarbon-formaldehyde resin.

9. The composition of claim 1 wherein the aliphatic acid is a tall oil fatty acid.

10. The composition of claim 3 wherein the monoether is a monobutyl ether of polyoxypropylene glycol, the diester is a dioleate of polyoxyethylene glycol, the phosphate ester is tributoxy ethyl phosphate, the polyolefin wax is polyethylene wax and the liquid carrier is mineral oil.

11. A process for producing the defoamer composition of claim 1 consisting essentially of
  (a) adding an oil soluble resin and optionally an aliphatic acid having from about 8 to about 22 carbon atoms to about 2 to about 20% by weight of hydrophobic silica suspended in a carrier liquid, the resin and acid being added in an effective amount sufficient to stabilize and inhibit settling of the silica in the liquid carrier, then
  (b) mixing at about 20° C. to about 150° C. to obtain a uniform mixture, then
  (c) homogenizing the mixture, and then
  (d) cooling to finish the defoamer composition.

12. The process of claim 11 wherein there is present from about 3 to about 25% by weight of oil soluble resin and optionally from about 0 to about 15% by weight of aliphatic acid.

13. A process for producing the defoamer composition of claim 3 consisting essentially of
  (a) dispersing finely divided emulsifiable polyolefin wax and oil soluble resin in a liquid carrier at about 20° C. to about 150° C. to obtain a homogenous dispersion, then
  (b) mixing hydrophobic silica suspended in a liquid carrier, monoether of polyoxyalkylene glycol, diester of polyoxyalkylene glycol, trialkyl phosphate ester and optionally aliphatic acid at about 20° C. to about 150° C. to obtain a suspension, then
  (c) mixing dispersion (a) and suspension (b) to obtain a uniform mixture, then
  (d) homogenizing the mixture, and then
  (e) cooling to finish the defoamer composition.

14. The process of claim 13 wherein the monoether is a monobutyl ether of polyoxypropylene glycol, the diester is a dioleate of polyoxyethylene glycol, the phosphate ester is tributoxy ethyl phosphate, the polyolefin wax is polyethylene wax and the liquid carrier is mineral oil.

15. A method of defoaming an aqueous system comprising adding a foam controlling amount of the defoamer composition of claim 1 to the aqueous system.

16. A method of foam prevention in a water based protective coating comprising adding a foam controlling amount of the defoamer composition of claim 1 to the coating.

17. A method of foam prevention in a water based adhesive comprising adding a foam controling amount of the defoamer composition of claim 1 to the adhesive.

18. A method of defoaming black liquid in papermaking comprising adding a foam controlling amount of the defoamer composition of claim 1 to the black liquor.

19. In an aqueous system defoamer composition containing from about 2 to about 20% by weight of hydrophobic silica suspended in a liquid carrier, the improvement consisting essentially of the presence of from about 3 to about 25% by weight of oil soluble resin and optionally from about 0 to about 15% of an aliphatic acid having from about 8 to about 22 carbon atoms to stabilize and inhibit settling of the silica suspended in the liquid carrier.

20. The composition of claim 19 wherein the oil soluble resin is selected from the group consisting of coumaroneindene resin, petroleum hydrocarbon resin, terpene resin and hydrocarbon-formaldehyde resin.

21. The composition of claim 19 wherein the oil soluble resin is a coumarone-indene resin.

22. The composition of claim 19 wherein the oil soluble resin is a petroleum hydrocarbon resin.

23. The composition of claim 19 wherein the oil soluble resin is a terpene resin.

24. The composition of claim 19 wherein the oil soluble resin is a hydrocarbon-formaldehyde resin.

25. The composition of claim 19 wherein the aliphatic acid is a tall oil fatty acid.

26. A process for producing the defoamer composition of claim 19 consisting essentially of
  (a) adding from about 3 to about 25% by weight of oil soluble resin and optionally from about 0 to about 15% of an aliphatic acid having from about 8 to about 22 carbon atoms to about 2 to about 20% by weight of hydrophobic silica suspended in a carrier liquid, the resin and acid being added to stabilize and inhibit settling of the silica in the liquid carrier, then
  (b) mixing at about 20° C. to about 150° C. to obtain a uniform mixture, then
  (c) homogenizing the mixture, and then
  (d) cooling to finish the defoamer composition.

27. A method of defoaming an aqueous system comprising adding a foam controlling amount of the defoamer composition of claim 19 to the aqueous system.

28. A method of foam prevention in a water based protective coating comprising adding a foam controlling amount of the defoamer composition of claim 19 to the coating.

29. A method of foam prevention in a water based adhesive comprising adding a foam controlling amount of the defoamer composition of claim 19 to the adhesive.

30. A method of defoaming black liquid in papermaking comprising adding a foam controlling amount of the defoamer composition of claim 19 to the black liquor.

* * * * *